United States Patent
Delplace et al.

(10) Patent No.: US 12,301,929 B2
(45) Date of Patent: May 13, 2025

(54) METHOD AND DEVICE FOR CONTROLLING THE STATE OF A DEVICE COMPRISING MEANS FOR TRANSFERRING AN AUDIOVISUAL SOURCE AND MEANS FOR REPRODUCING AN AUDIO SIGNAL

(71) Applicant: SAGEMCOM BROADBAND SAS, Rueil-Malmaison (FR)

(72) Inventors: Stéphane Delplace, Rueil Malmaison (FR); Piero Indiveri, Rueil Malmaison (FR)

(73) Assignee: SAGEMCOM BROADBAND SAS, Bois-Colombes (FR)

(*) Notice: Subject to any disclaimer, the term of this patent is extended or adjusted under 35 U.S.C. 154(b) by 329 days.

(21) Appl. No.: 17/544,474

(22) Filed: Dec. 7, 2021

(65) Prior Publication Data

US 2022/0201356 A1 Jun. 23, 2022

(30) Foreign Application Priority Data

Dec. 18, 2020 (FR) .................................... 2013689

(51) Int. Cl.
*H04N 21/233* (2011.01)
*H04N 21/43* (2011.01)
(Continued)

(52) U.S. Cl.
CPC ..... *H04N 21/43635* (2013.01); *H04N 21/439* (2013.01); *H04N 21/4436* (2013.01)

(58) Field of Classification Search
None
See application file for complete search history.

(56) References Cited

U.S. PATENT DOCUMENTS

2008/0152023 A1* 6/2008 Yoshida ................. G09G 5/006
348/553
2011/0242415 A1* 10/2011 Wakabayashi ......... G09G 5/006
348/554

(Continued)

FOREIGN PATENT DOCUMENTS

CN 209313968 U 8/2019
EP 1 816 868 A1 8/2007

OTHER PUBLICATIONS

HDMI Licensing, LLC, "High-Definition Multimedia Interface, Specification Version 1.4," Jun. 5, 2009, XP-009133650, Retrieved Jun. 16, 2010, [http: //wenku.baidu.com/view/e7db77d184254b35eefd34d0.html].

(Continued)

*Primary Examiner* — Brian T Pendleton
*Assistant Examiner* — Jean D Saint Cyr
(74) *Attorney, Agent, or Firm* — Williams Mullen; R. Brian Drozd

(57) ABSTRACT

A method and a device for controlling the state of a device including means for transferring an audiovisual source and means for reproducing an audio signal, the device being connected to a television set by means of an HDMI connection in accordance with an HDMI specification version 2.0 or higher. The device is in an operating mode as an audiovisual source or for reproducing an audio signal coming from the HDMI connection. The device: receives a change command, goes into the mode of reproducing an audio signal coming from the HDMI connection if it is in the audiovisual source mode, checks whether an audio signal coming from the HDMI connection is present and, if so, reproduces the audio signal coming from the HDMI connection by the means for reproducing an audio signal.

8 Claims, 3 Drawing Sheets

(51) Int. Cl.
    *H04N 21/4363*    (2011.01)
    *H04N 21/439*     (2011.01)
    *H04N 21/443*     (2011.01)
    *H04N 21/485*     (2011.01)

(56)                 References Cited

U.S. PATENT DOCUMENTS

2012/0128179 A1     5/2012   Kano et al.
2012/0307157 A1   12/2012   Utsunomiya
2016/0366470 A1*  12/2016   Rabii .............. H04N 21/43635

OTHER PUBLICATIONS

HDMI Forum, "High-definition Multimedia Interface, Specification Version 2.0," Sep. 4, 2013, pp. 1-245, Retrieved Jul. 5, 2017, [hdmiforum.org].
Jun. 18, 2021 Search Report issued in French Patent Application No. 2013689.

\* cited by examiner

METHOD AND DEVICE FOR CONTROLLING THE STATE OF A DEVICE COMPRISING MEANS FOR TRANSFERRING AN AUDIOVISUAL SOURCE AND MEANS FOR REPRODUCING AN AUDIO SIGNAL

TECHNICAL FIELD

The present invention is in the audiovisual field and more particularly in the control of the state and the putting in sleep mode of a device comprising means for transferring an audiovisual source and means for reproducing an audio signal.

PRIOR ART

Current domestic audiovisual systems use connections for example in accordance with the HDMI (High Definition Multimedia Interface) specification for connecting the various multimedia devices to a television set.

The multimedia devices are for example audio/video sources such as Blu-ray players, digital television set-top boxes, video game consoles, audio amplifiers, loudspeakers, etc.

Multimedia devices behave with respect to a television set as an audiovisual source or as a destination of an audio signal.

The HDMI specification as from version 2.0 makes it possible to declare a multimedia device both as an audiovisual source and an audio content destination.

These devices thus comprise means for transferring an audiovisual source and means for reproducing an audio signal that may at the same time be a source of an audiovisual signal and reproduce an audio signal.

A device comprising means for transferring an audiovisual source and means for reproducing an audio signal enables an audiovisual system to receive an audiovisual content by means of an HDMI connection or allows the reproduction by said device of an audio signal received via the HDMI connection. Such a device does not enable the audiovisual system to receive an audiovisual content by means of an HDMI connection and to reproduce by said device an audio signal received via the HDMI connection simultaneously.

When a user of the audiovisual system wishes to change the operating state of the device comprising means for transferring an audiovisual source and means for reproducing an audio signal, for example going into the mode for transferring an audiovisual source to the sound reproduction mode, it must deactivate the mode for transferring an audiovisual source and activate the sound reproduction mode. This may be detrimental for the user in that the latter must make two distinct commands for achieving the change of state.

One solution would consist of automatically deactivating the means for transferring an audiovisual source and automatically activating the means for reproducing an audio signal. This solution would nevertheless oblige the user to implement additional commands when he wishes to put the means for reproducing an audible signal in sleep mode.

These various commands for managing the operating state of the device comprising means for transferring an audiovisual source and means for reproducing an audio signal make the task of the user of the audiovisual system complicated.

In the case where the operating state of the device comprising means for transferring an audiovisual source and means for reproducing an audio signal is the putting in sleep mode or not thereof, the device comprising means for transferring an audiovisual source and means for reproducing an audio signal on reception of the sleep signal deactivates the means for transferring an audiovisual source and the means for reproducing an audio signal.

This putting in total sleep mode may not correspond to the wishes of the user in the case where the latter wished to put in sleep mode only one of the functionalities of the device comprising means for transferring an audiovisual source and means for reproducing an audio signal. To mitigate this, various commands would be necessary for managing the operating state of the device comprising means for transferring an audiovisual source and means for reproducing an audio signal. Which further complicates the task of the user of the system.

DISCLOSURE OF THE INVENTION

The invention aims to improve the management, by a user of an audiovisual system, of the operating state of a device comprising means for transferring an audiovisual source and means for reproducing an audio signal.

For this purpose, according to a first aspect, the invention proposes a method for controlling the state of a device comprising means for transferring an audiovisual source and means for reproducing an audio signal, the device comprising the means for transferring an audiovisual source and the means for reproducing an audio signal being connected to a television set by means of a connection of the high-definition multimedia interface type HDMI in accordance with an HDMI specification version 2.0 or higher, characterised in that the device comprising the means for transferring an audiovisual source and the means for reproducing an audio signal is in a mode of operating as an audiovisual source or in an operating mode of reproducing an audio signal coming from the HDMI connection, and the method comprises the steps performed by the device comprising the means for transferring an audiovisual source and the means for reproducing an audio signal of:

receiving a command to change state of the device comprising the means for transferring an audiovisual source and the means for reproducing an audio signal, putting the device comprising the means for transferring an audiovisual source and the means for reproducing an audio signal in the mode of reproducing an audio signal coming from the HDMI connection if the device comprising the means for transferring an audiovisual source and the means for reproducing an audio signal is in the audiovisual source mode, checking whether an audio signal coming from the HDMI connection is present and, if so, reproducing the audio signal coming from the HDMI connection by the means for reproducing an audio signal if an audio signal coming from the HDMI connection is present.

The invention also relates to a device for controlling the state of a device comprising means for transferring an audiovisual source and means for reproducing an audio signal, the device comprising the means for transferring an audiovisual source and the means for reproducing an audio signal being connected to a television set by means of a connection of the high-definition multimedia interface type HDMI in accordance with an HDMI specification version 2.0 or higher, characterised in that the device comprising the means for transferring an audiovisual source and the means for reproducing an audio signal is in an audiovisual source operating mode or in an operating mode of reproducing an audio signal coming from the HDMI connection and the device comprising the means for transferring an audiovisual source and the means for reproducing an audio signal comprises:

means for receiving a command to change state of the device comprising the means for transferring an audiovisual source and the means for reproducing an audio signal, means for putting the device comprising the means for transferring an audiovisual source and the means for reproducing an audio signal in the mode of reproducing an audio signal coming from the HDMI connection if the device comprising the means for transferring an audiovisual source and the means for reproducing an audio signal is in the audiovisual source mode, means for checking whether an audio signal coming from the HDMI connection is present and, if so, means for activating the means for reproducing an audio signal coming from the HDMI connection Thus the present invention makes it possible to simplify the task of the user of the system in controlling the various operating states of the device comprising the means for transferring an audiovisual source and the means for reproducing an audio signal.

The present invention makes it possible to automatically switch from the audiovisual source operating mode to the operating mode of reproducing an audio signal for reproducing an audio signal coming from the HDMI connection.

According to a particular embodiment of the invention, the device comprising the means for transferring an audiovisual source and the means for reproducing an audio signal is put in sleep mode if the device comprising the means for transferring an audiovisual source and the means for reproducing an audio signal is in the operating mode of reproducing an audio signal coming from the HDMI connection.

Thus the present invention makes it possible to avoid the inconveniences caused by a total sleep mode of the device comprising means for transferring an audiovisual source and means for reproducing an audio signal and enables the user of the audiovisual system to continue to benefit from the audio signal reproduction functionality when an audio signal coming from the HDMI connection is present.

According to a particular embodiment of the invention, if an audio signal coming from the HDMI connection is not present, the method further comprises the step of putting the device comprising the means for transferring an audiovisual source and the means for reproducing an audio signal in sleep mode.

Thus the present invention makes it possible to put the device comprising means for transferring an audiovisual source and means for reproducing an audio signal in sleep mode in a manner that is simple for the user of the audiovisual system.

According to a particular embodiment, putting the device comprising the means for transferring an audiovisual source and the means for reproducing an audio signal in sleep mode comprises putting in sleep mode or switching off all or some of the elements of the audio processing and reproduction path, such as for example a signal-processing processor dedicated to audio processing or an audio amplifier, without this list being limitative.

According to a particular embodiment of the invention, the command to change state of the device comprising the means for transferring an audiovisual source and the means for reproducing an audio signal is a command to put in sleep mode.

According to a particular embodiment of the invention, the command to change state of the device comprising the means for transferring an audiovisual source and the means for reproducing an audio signal is a message of the <Active Source> type received on a consumer electronic control bus of the HDMI connection.

According to a particular embodiment of the invention, when the device comprising the means for transferring an audiovisual source and the means for reproducing an audio signal is in the audiovisual source mode, the device comprising the means for transferring an audiovisual source and the means for reproducing an audio signal is in the audiovisual source mode, transfers solely the video part of the audiovisual signal and reproduces, by the means for reproducing an audio signal, the decoded audio component of the audiovisual signal.

According to a particular embodiment of the invention, the device comprising the means for transferring an audiovisual source and the means for reproducing an audio signal is put in sleep mode if the device comprising the means for transferring an audiovisual source and the means for reproducing an audio signal is in the operating mode of reproducing an audio signal coming from the HDMI connection.

Thus the present invention makes it possible to avoid the inconveniences caused by a total sleep mode of the device comprising means for transferring an audiovisual source and means for reproducing an audio signal and enables the user of the audiovisual system to continue to benefit from the audio signal reproduction functionality when an audio signal coming from the HDMI connection is present.

According to a particular embodiment of the invention, if an audio signal coming from the HDMI connection is not present, the method further comprises the step of putting the device comprising the means for transferring an audiovisual source and the means for reproducing an audio signal in sleep mode.

Thus the present invention makes it possible to put the device comprising means for transferring an audiovisual source and means for reproducing an audio signal in sleep mode in a manner that is simple for the user of the audiovisual system.

According to a particular embodiment, putting the device comprising the means for transferring an audiovisual source and the means for reproducing an audio signal in sleep mode comprises putting in sleep mode or switching off all or some of the elements of the audio processing and reproduction path, such as for example a signal-processing processor dedicated to audio processing or an audio amplifier, without this list being limitative.

According to a particular embodiment of the invention, the command to change state of the device comprising the means for transferring an audiovisual source and the means for reproducing an audio signal is a command to put in sleep mode.

According to a particular embodiment of the invention, the command to change state of the device comprising the means for transferring an audiovisual source and the means for reproducing an audio signal is a message of the <Active Source> type received on a consumer electronic control bus of the HDMI connection.

According to a particular embodiment of the invention, when the device comprising the means for transferring an audiovisual source and the means for reproducing an audio signal is in the audiovisual source mode, the device comprising the means for transferring an audiovisual source and the means for reproducing an audio signal is in the audiovisual source mode, transfers solely the video part of the audiovisual signal and reproduces, by the means for reproducing an audio signal, the decoded audio component of the audiovisual signal.

The present invention also relates to a computer program product. It comprises instructions for implementing, by a node device, the method according to one of the preceding embodiments, when said program is executed by a processor of the node device.

The present invention also relates to a storage medium. It stores a computer program comprising instructions for implementing, by a node device, the method according to one of the preceding embodiments, when said program is executed by a processor of the node device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
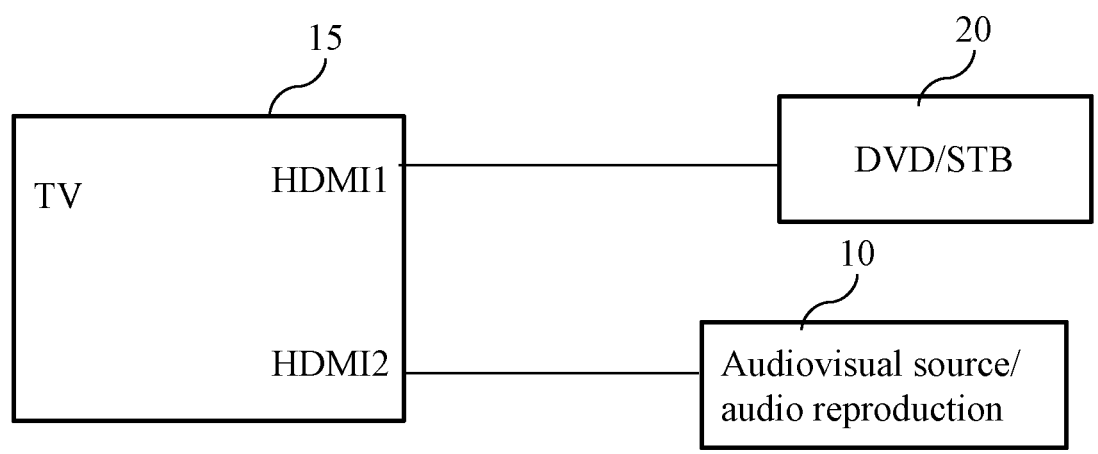
FIG. 1 illustrates schematically an audiovisual system wherein the present invention is implemented.

FIG. 1 illustrates schematically an audiovisual system wherein the present invention is implemented.

In the example in FIG. 1, a television set 15 is connected to an audiovisual source 20 and to a device 10 comprising means for transferring an audiovisual source and means for reproducing an audio signal by means of HDMI connections.

The audiovisual source 20 is for example a Blu-ray player, a digital television set-top box, or a video game console. The audiovisual source is connected to the television set 15 by an HDMI cable plugged for example into the HDMI 1 port of the television set 15.

The means for transferring an audiovisual source of the device 10 are for example a Blu-ray player or a digital television set-top box or a video game console and the means for reproducing an audio signal are an amplifier and at least one loudspeaker, or an audio output that may be amplified or not amplified. The device is connected to the television set 15 by an HDMI cable plugged for example into the HDMI 2 port of the television set 15.

For reason of simplification, only two multimedia devices and two HDMI ports are shown in FIG. 1. Naturally, the television set 15 comprises a larger number of HDMI ports where other multimedia devices can be connected.

As from the HDMI 2.0 specification, a multimedia device can declare itself both as an audiovisual source and an audio content destination.

The television set 15 attributes the physical address 1.0.0.0 for example to the audiovisual source 20 connected to the HDMI port 1 and attributes the physical address 2.0.0.0 for example to the device 10 comprising means for transferring an audiovisual source and means for reproducing an audio signal connected to the HDMI port 2.

The audiovisual source 20 seeks in a list of logic addresses the first logic address corresponding to its type. The audiovisual source 20 attributes to itself a playback system logic address as described at points 11.3.2 and 11.3.3 of the HDMI 2.0 specification, for example the logic address PLAYBACK1.

The device 10 comprising means for transferring an audiovisual source and means for reproducing an audio signal seeks in a list of logic addresses the first logic address corresponding to each of its types. The device 10 comprising means for transferring an audiovisual source and means for reproducing an audio signal attributes to itself the first available playback system logic address, for example the logic address PLAYBACK2 and, if the audio system logic address AUDIOSYSTEM is available, it attributes it to itself, as described at points 11.3.2 and 11.3.3 of the HDMI 2.0 specification.

If the logic address AUDIOSYSTEM is not available, since another AUDIOSYSTEM is already present, the device 10 comprising means for transferring an audiovisual source and means for reproducing an audio signal:

deactivates the audio system functionality and reactivates the sending of the audio signal to the television set 15 through the HDMI connection so that the sound is reproduced by the AUDIOSYSTEM peripheral already present, or activates the means for reproducing an audio signal solely for reproducing the decoded audio component of an audiovisual signal delivered by the device, optionally by ceasing to transmit the audio signal through the HDMI connection in order to avoid a double sound reproduction, or demands the generation of a message intended for the user notifying the latter that it is impossible to use the means for reproducing an audio signal because of the presence of another audio reproduction system.

When the device 10 comprising means for transferring an audiovisual source and means for reproducing an audio signal is not in the audiovisual source operating mode, and receives from the television set 15 an audio mode request message such as the message <System Audio Mode Request [1.0.0.0]> as described in the HDMI specification 2.0 table 11.24, the device 10 comprising means for transferring an audiovisual source and means for reproducing an audio signal responds that the audio system is activated by sending for example the CEC message <Set System Audio Mode (On)> as described in the HDMI specification 2.0 table 11.24, and locally reproduces the audio component coming from the audio return channel (ARC) of the HDMI 2 connection.

CEC is the acronym for the English term Consumer Electronic Control.

More precisely, the television set 15 sends to the device 10 comprising means for transferring an audiovisual source and means for reproducing an audio signal the message of the type <System Audio Mode Request> with the physical address of the device from which the audio comes, for example the physical address of the audiovisual source 20 the video programme of which is reproduced by the television set 15.

When the device 10 comprising means for transferring an audiovisual source and means for reproducing an audio signal is in an audiovisual source operating mode and when the device 10 comprising means for transferring an audiovisual source and means for reproducing an audio signal receives from the television set 15 an audio mode request message such as the message <System Audio Mode Request

[2.0.0.0]>, the device 10 comprising means for transferring an audiovisual source and means for reproducing an audio signal responds that the audio system is activated by sending for example the CEC message <Set System Audio Mode (On)>, transfers solely the video part of the audiovisual signal and locally reproduces, by the means for reproducing an audio signal 207, the decoded audio component of the audiovisual signal.

In other words, at the moment of changing the HMDI port used for the audiovisual source, the television set 15 sends a CEC message <Set Stream Path>, the device 10 comprising means for transferring an audiovisual source and means for reproducing an audio signal responds by sending to the television set 15 a message of the <Image View On> type and broadcasts a message of the <Active Source> type.

This is because using the audio return channel (ARC) in this case would give rise to an unnecessary latency and especially would limit the audio source to ARC-compatible formats whereas the means for reproducing an audio signal 207 can support superior audio formats.

Figure 2:
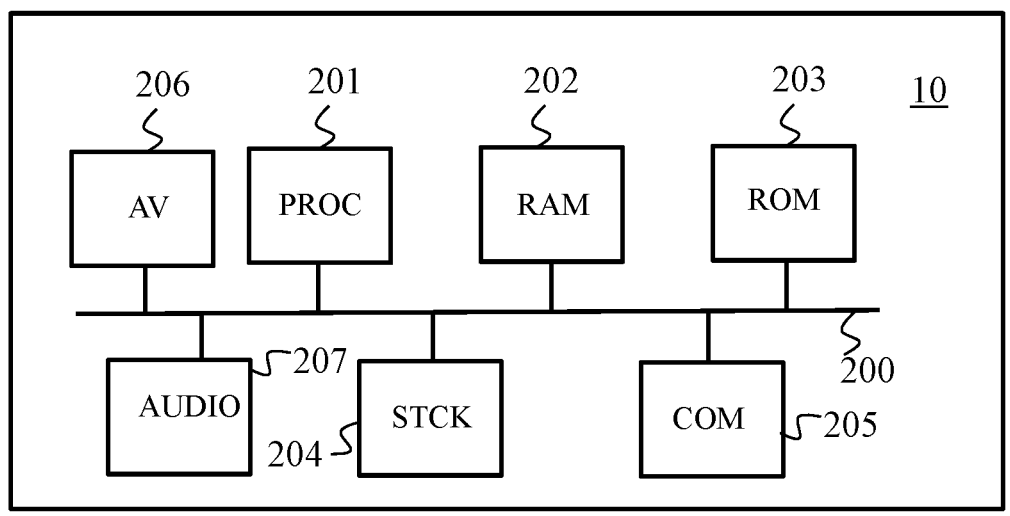
FIG. 2 illustrates schematically an example of hardware architecture of a device comprising means for transferring an audiovisual source and means for reproducing an audio signal.

FIG. 2 illustrates schematically an example of hardware architecture of a device comprising means for transferring an audiovisual source and means for retrieving an audio signal.

According to the example of hardware architecture shown in FIG. 2, the device 10 comprising means for transferring an audiovisual source and means for reproducing an audio signal comprises, connected by a communication bus 200: a processor or CPU (central processing unit) 201; a random access memory RAM 202; a read only memory ROM 203; a storage unit such as a hard disk (or a storage medium reader, such as an SD (Secure Digital) card reader 204; audio reproduction means AUDIO 206 and an audiovisual source AV 206, at least one communication interface 505 enabling the device 10 comprising means for transferring an audiovisual source and means for reproducing an audio signal to communicate by means of at least one HDMI port with the television set 15 or other multimedia devices and to communicate by means of a wide area network, not shown in FIG. 1, when the latter comprises a digital television set-top box.

The processor 201 is capable of executing instructions loaded in the RAM 202 from the ROM 203, from an external memory (not shown), from a storage medium (such as an SD card), or from a communication network. When the device 10 comprising means for transferring an audiovisual source and means for reproducing an audio signal 0 is powered up, the processor 201 is capable of reading instructions from the RAM 202 and executing them. These instructions form a computer program causing the implementation, by the processor 201, of all or part of the method described in relation to FIG. 3.

The method described below in relation to FIG. 3 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the incident-detection device comprises electronic circuitry configured for implementing the method described in relation to FIG. 3.

Figure 3:
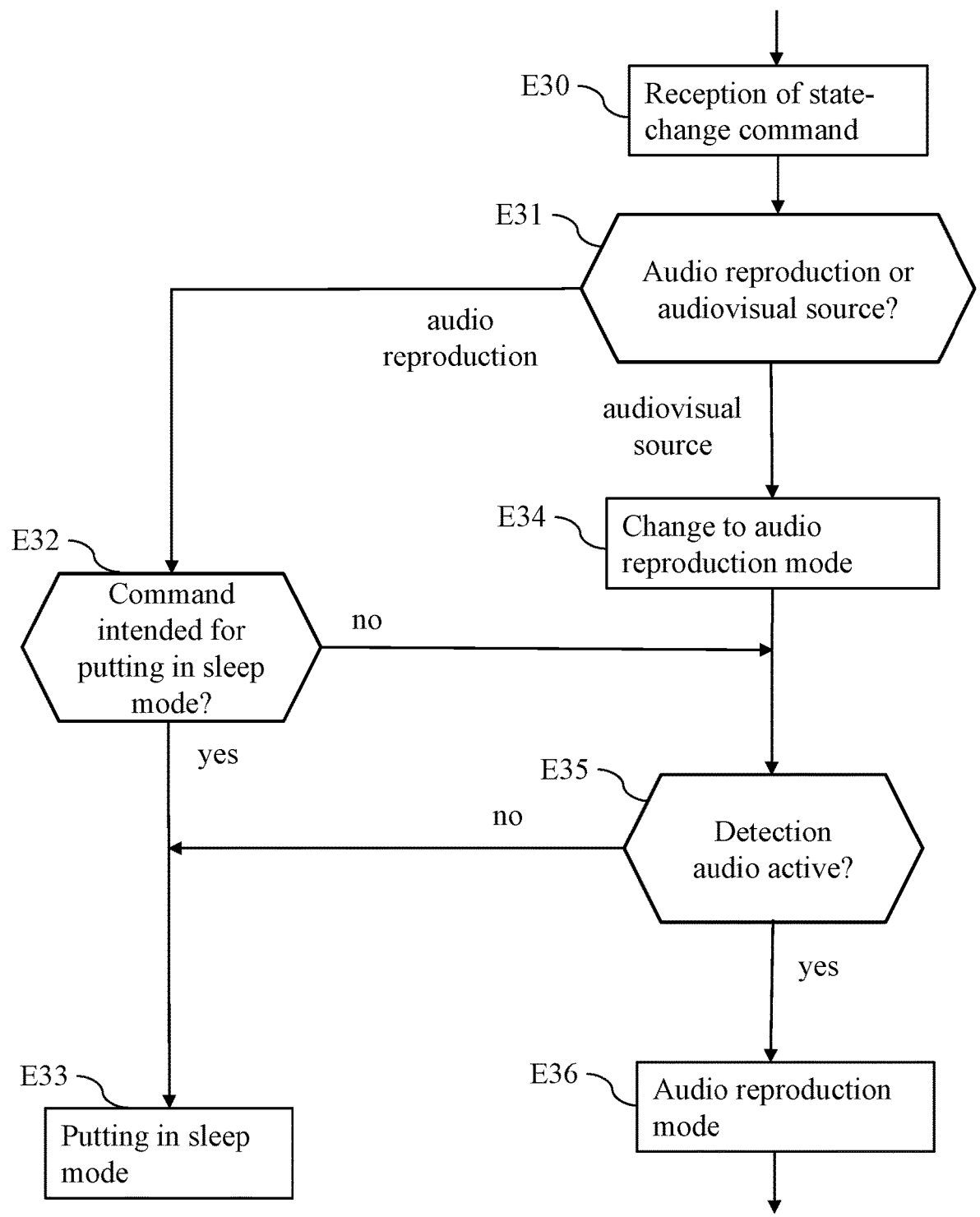
FIG. 3 illustrates schematically a method for controlling the state of a device comprising means for transferring an audiovisual source and means for reproducing an audio signal.

FIG. 3 illustrates schematically a method for controlling the state of a device comprising means for transferring an audiovisual source and means for reproducing an audio signal.

At the step E30, the device comprising means for transferring an audiovisual source and means for reproducing an audio signal receives a command sent by the user of the audiovisual system.

The command to change state of the device 10 can be initiated by various means, such as for example, and non-limitatively, a user action in the menu of the graphical interface, the reception of a message by the network, pressing on a button of the front panel of the device, or pressing on a button of a remote control (for example state-change button or sleep button) making it possible to control the device.

Optionally, the command to change state may also be received by the HDMI connection, via the CEC bus, if another HDMI device becomes an audiovisual source. This may for example be the case when the user selects, in the interface of the television 15, an HDMI port connected to an item of equipment other than the device 10, or when another item of HDMI equipment such as the device 20 is switched on, if this device declares itself as an active audiovisual source when it is started up.

In such cases, the device 10 receives on the CEC bus a message of the <Active Source> type coming from the new audiovisual source. The device 10 then considers this message to be a state-change command.

At the step E31, the device 10 determines the operating mode in which it is situated: audiovisual source or audio mode. If the device 10 is in the audiovisual source mode, the device 10 passes to the step E34. If the device 10 is in the audio mode, the device 10 passes to the step E32.

At the step E32, the device 10 determines whether or not the state-change command can be assimilated to a sleep command. For example, pressing on a "sleep" button is considered to be assimilated to a sleep command, whereas a message <Active Source> received on the CEC bus or pressing on a state-change key on the remote control of the device 10 will not be considered to be assimilated to sleep commands, even if these are state-change commands.

If the device 10 determines that the state-change command can be assimilated to a sleep command, the device 10 passes to the step E33. If the device 10 determines that the state-change command cannot be assimilated to a sleep command, the device 10 passes to the step E35.

At the step E33, the device 10 is put in sleep mode.

For example, only the processor 201 and the RAM memory 202 are supplied with electric power along with the components necessary for restarting the device 10 and, when the user of the device 10 wishes to restart the device 10, the restart will be implemented from the last state in which the processor 201 was, or in the audio operating mode, or in the audiovisual source operating mode, according to the implementation choices or the user parameters.

For example, only the RAM memory 202 is supplied with electric power as well as the components necessary for restarting the device 10 and, when the user of the device 10 wishes to restart the device 10, the restarting will be implemented as from the last state in which the RAM memory 202 was or in the audio operating mode or in the audiovisual source operating mode.

For example, the content of the RAM memory 202 is saved in the non-volatile storage unit STCK 204, the processor 201 and the RAM memory 202 are no longer supplied with electric power as well as the components not necessary for restarting the device 10. When the user of the device 10 wishes to restart the device 10, the restarting will be implemented as from the last state in which the non-volatile storage unit STCK 204 was or in the audio operating mode or in the audiovisual source operating mode.

For example, the processor 201 and the RAM memory 202 are no longer supplied with electric power, only the components necessary for restarting the device 10 are powered. When the user of the device 10 wishes to restart the device 10, the complete restarting will be implemented from a so-called service mode.

At the step E34, the device 10 switches into the audio operating mode and at the step E35 checks whether an audio signal is present on the audio return channel ARC of the HDMI 2 port.

If an audio signal is present on the audio return channel ARC of the HDMI 2 port, the device 10 passes to the step E36. If not, the device 10 passes to the step E33.

The non-detection of the audio signal on the return channel ARC is for example implemented by detecting an absence of signal during a predetermined period or by detecting a signal that does not comprise audio data or an audio signal the amplitude of which is zero or below a predetermined threshold during a predetermined period.

At the step E36, the device 10 locally reproduces the audio component coming from the audio return channel (ARC) of the HDMI 2 connection and thus does not go into sleep mode.

The invention claimed is:

1. A method for controlling the state of a device comprising at least one processor configured for transferring an audiovisual source and for reproducing an audio signal, the device being connected to a television set via a connection of the high-definition multimedia interface type HDMI in accordance with an HDMI specification version 2.0 or higher, wherein the device is in a mode of operating as an audiovisual source or in an operating mode of reproducing an audio signal coming from the HDMI connection, and the method causing the device to perform:
   receiving a command to change state of the device, the command to change state of the device being a command to put in sleep mode or a message of the <Active Source> type received on a consumer electronic control bus of the HDMI connection, and
   following the receiving of the command to change state:
   putting the device in the mode of reproducing an audio signal coming from the HDMI connection if the device is in the audiovisual source mode,
   checking whether an audio signal coming from the HDMI connection is present and, if so,
   reproducing the audio signal coming from the HDMI connection by a processor of the at least one processor configured for reproducing an audio signal and not reproducing an audiovisual signal.

2. The method according to claim 1, wherein the method further causes the device to perform:
   putting the device in sleep mode if the device is in the operating mode of reproducing an audio signal coming from the HDMI connection.

3. The method according to claim 1, wherein, if an audio signal coming from the HDMI connection is not present, the method further comprises the step of putting the device in sleep mode.

4. The method according to claim 2, wherein putting the device in sleep mode comprises putting in sleep mode or switching off an audio amplifier.

5. The method according to claim 1, wherein, when the device is in the audiovisual source mode, the device that is in the audiovisual source mode, transfers solely the video part of the audiovisual signal and reproduces, by the processor of the at least one processor configured for reproducing an audio signal, the decoded audio component of the audiovisual signal.

6. A device for controlling the state of a device comprising at least one processor configured for transferring an audiovisual source and for reproducing an audio signal, the device being connected to a television set via a connection of the high-definition multimedia interface type HDMI in accordance with an HDMI specification version 2.0 or higher, wherein the device is in an audiovisual source operating mode or in an operating mode of reproducing an audio signal coming from the HDMI connection and the device comprises circuitry causing the device to perform:
   receiving a command to change state of the device,
   putting the device in the mode of reproducing an audio signal coming from the HDMI connection if the device is in the audiovisual source mode,
   checking whether an audio signal coming from the HDMI connection is present and, if so,
   activating a processor of the at least one processor for reproducing an audio signal coming from the HDMI connection and not reproducing an audiovisual signal.

7. The device according to claim 6, the device to perform further comprising circuitry causing the device to perform:
   putting in sleep mode the device activated if the device is in the operating mode of reproducing an audio signal coming from the HDMI connection.

8. A non-transitory storage medium, that stores a computer program comprising instructions for implementing the method according to claim 1, when said program is executed by a computer processor.

* * * * *